United States Patent [19]

Ueno et al.

[11] Patent Number: 5,117,070
[45] Date of Patent: May 26, 1992

[54] DATA TRANSMISSION CONTROL PROCESSING SYSTEM

[75] Inventors: Reiko Ueno, Neyagawa; Naofumi Nakatani, Takatsuki; Masao Ikezaki, Neyagawa; Terumasa Yamamoto, Takatsuki; Hiromasa Nakatsu, Osaka, all of Japan

[73] Assignee: Matsushita Electric Industrial Co., Ltd., Osaka, Japan

[21] Appl. No.: 595,227

[22] Filed: Oct. 9, 1990

[30] Foreign Application Priority Data

Oct. 6, 1989 [JP] Japan .................................. 1-262439

[51] Int. Cl.$^5$ ............................................. H04L 17/00
[52] U.S. Cl. ........................................ 178/2 R; 178/3; 178/17.5; 370/43; 340/825.52
[58] Field of Search .......................... 178/2 R, 3, 17.5; 370/43; 340/825.21, 825.27, 825.52

[56] References Cited

U.S. PATENT DOCUMENTS 4,801,934  1/1989  Herbert ................................. 178/3 X Primary Examiner—Stafford D. Schreyer
Attorney, Agent, or Firm—Wenderoth, Lind & Ponack

[57] ABSTRACT

A data transmission control processing system comprising the steps of easily realizing the reading, writing of the memories of the other terminals coupled with the above described transmission passages in a system where a plurality of terminals provided with a transmitting, receiving control processing portion for transmitting receiving the control signals are coupled by transmitting passages so as to effect the mutual communication, realizing the writing onto the memories by a system similar to the reading of the memories when the above described system is a system by the D2B, being capable of easily coping with respect to the expansion of the reading.writing control operation of the memories, simplifying the realization of the reading.writing control sequence which is adapted to reduce the amount of the telegraphic messages to be exchanged in the reading.writing operation of the memories on the other terminal.

4 Claims, 20 Drawing Sheets

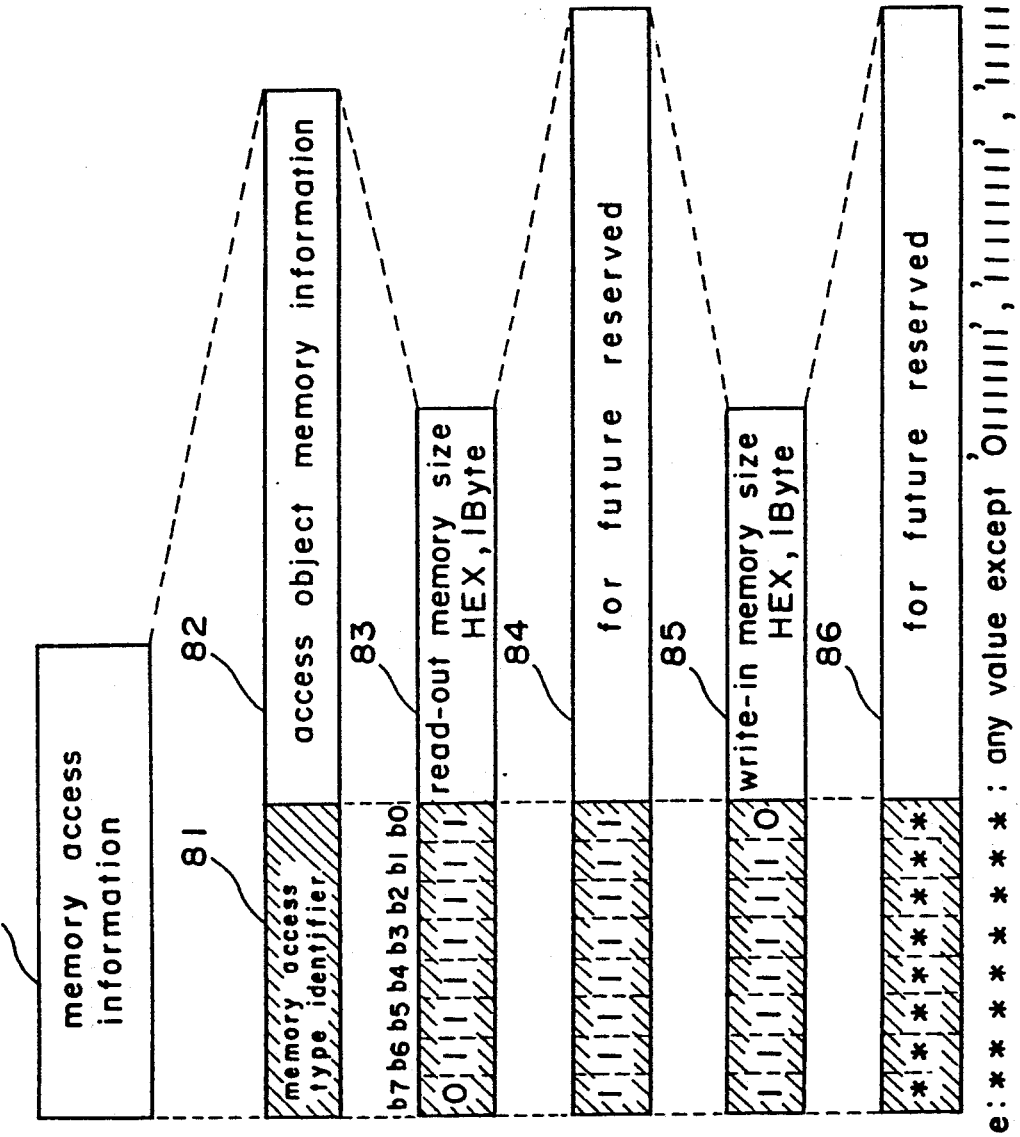

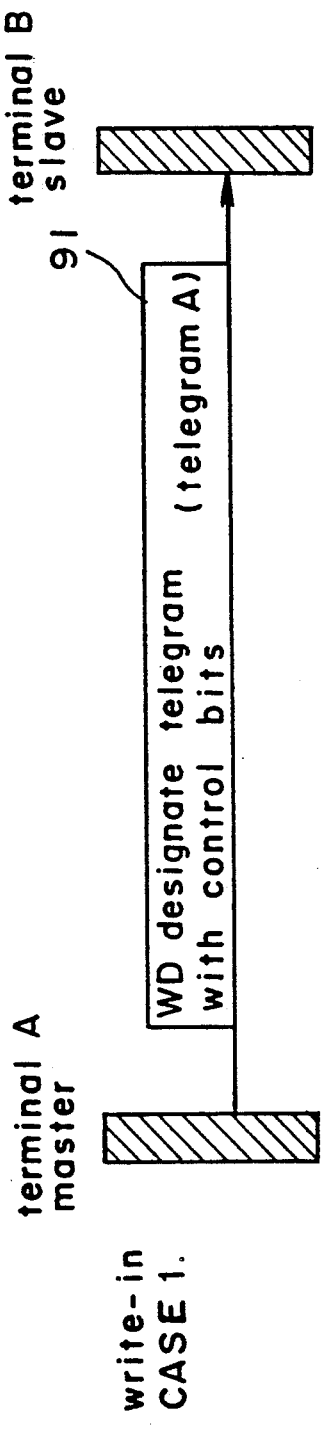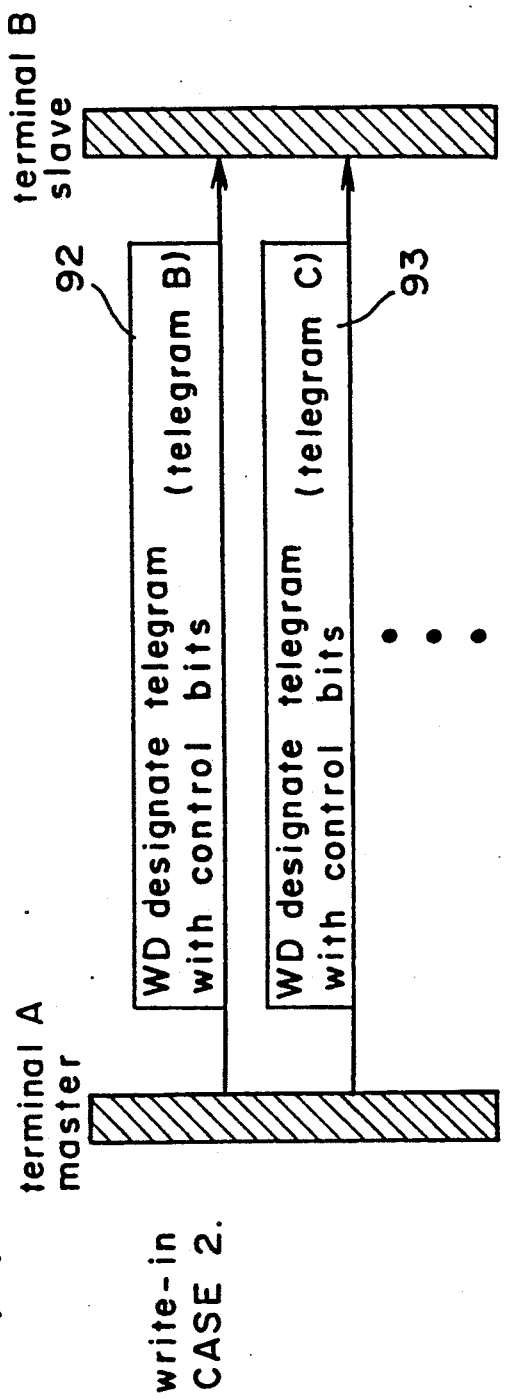

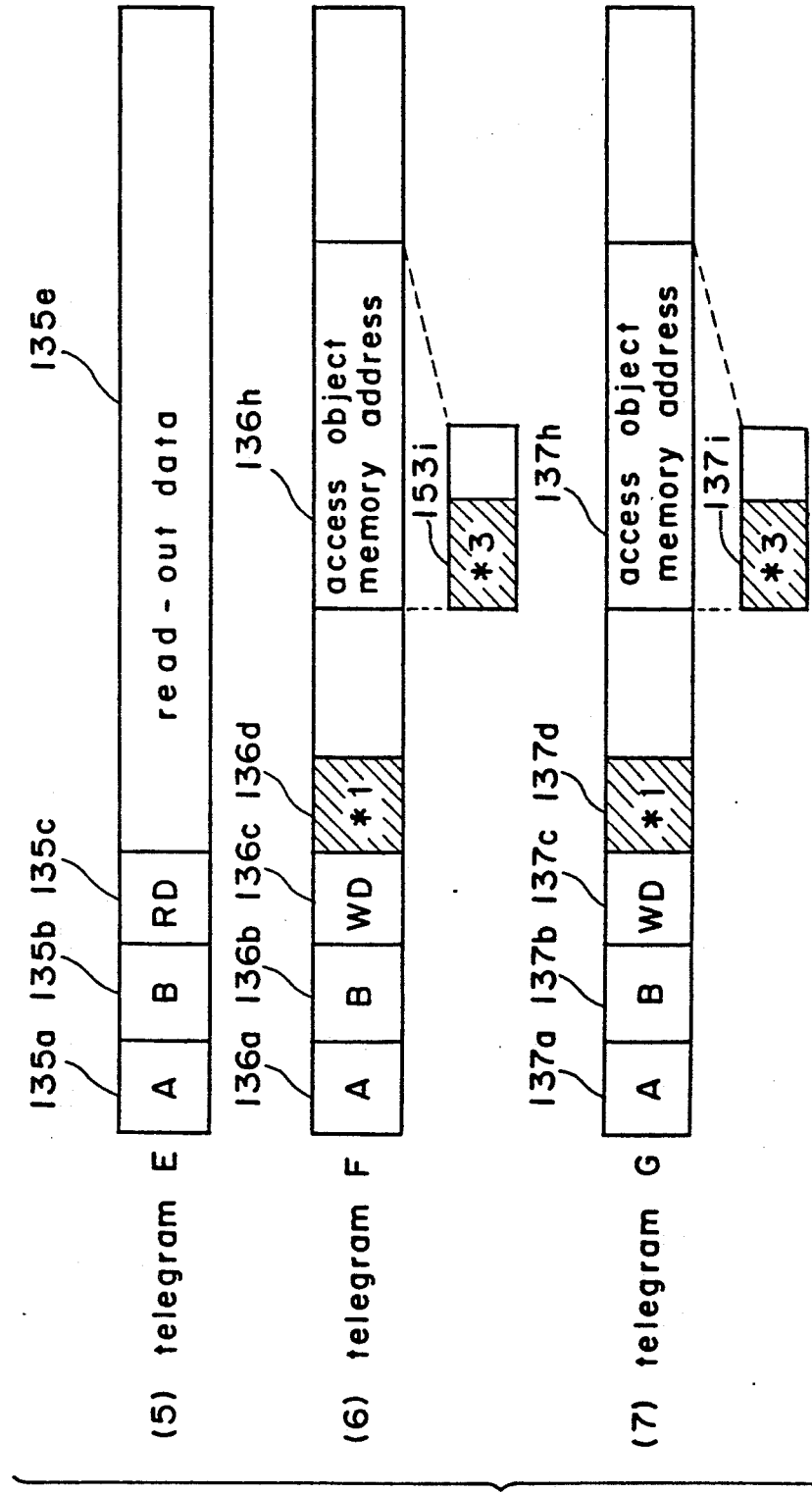

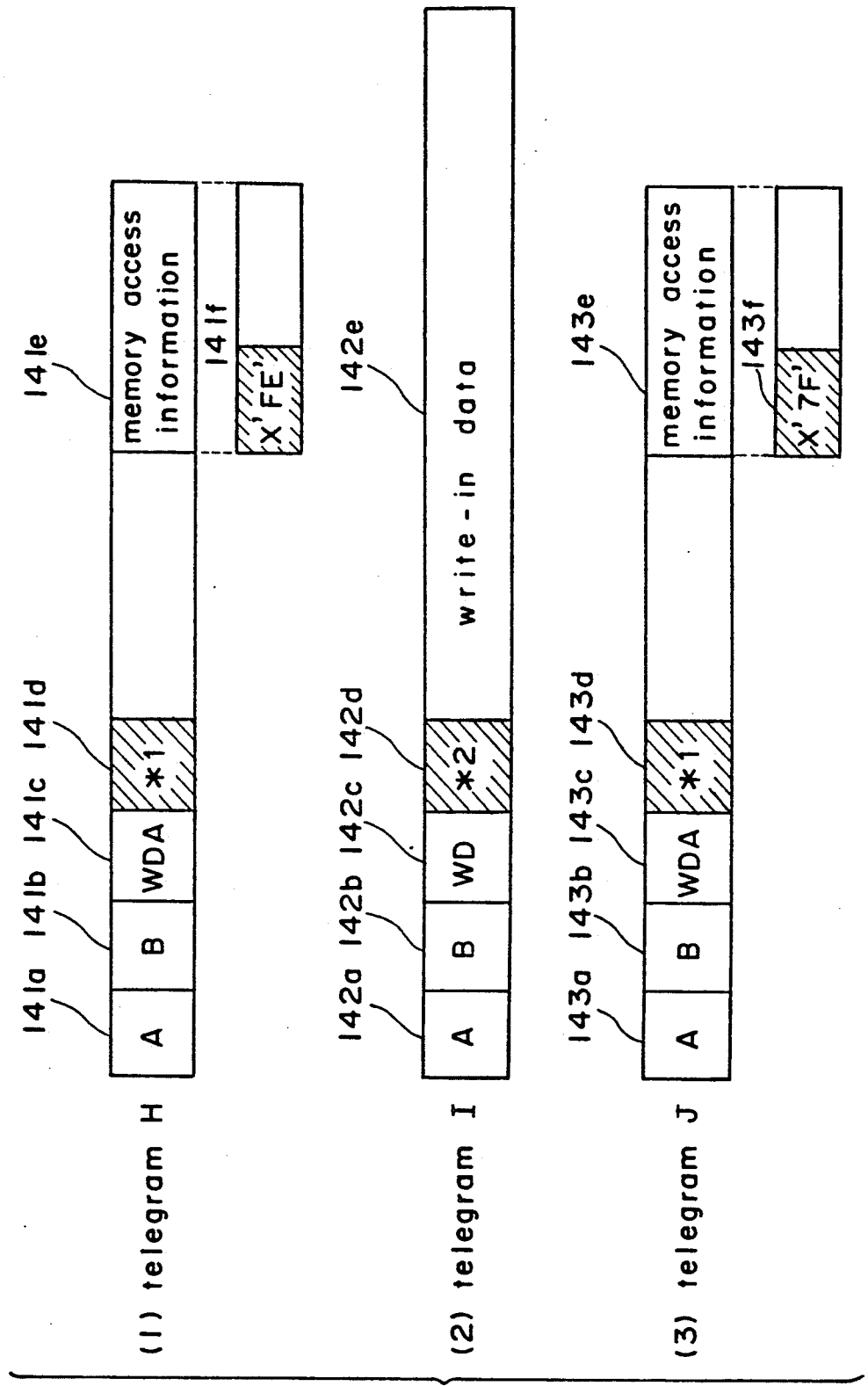

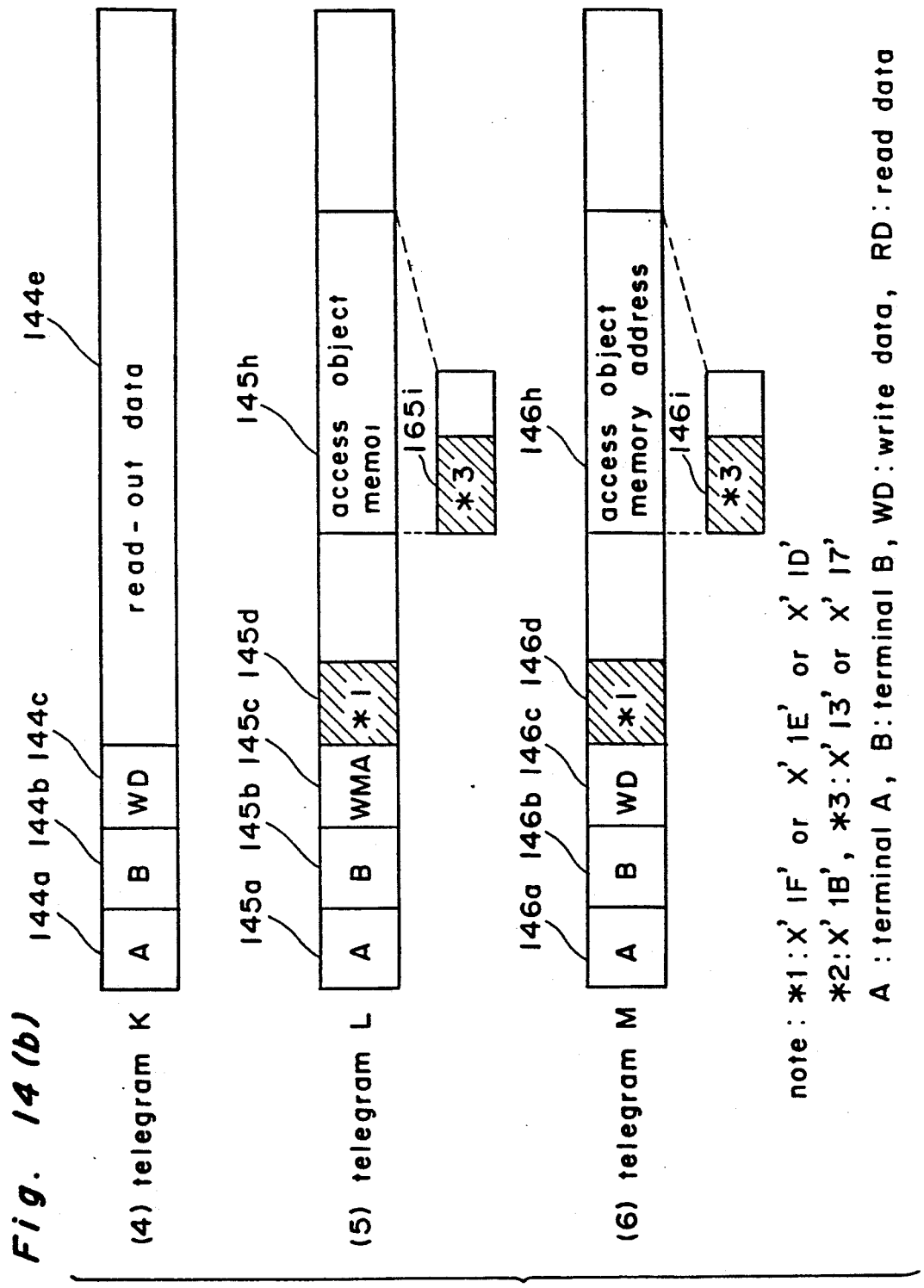

note: S: start bits
P: parity bits  odd parity
A: ACK response bits from parter device
EOD: End of data showing termination of data if EOD=0
showing continuation of data bits if EOD=1

Fig. 17

| control bits | | | | direction | Operation | Locking |
|---|---|---|---|---|---|---|
| b3 | b2 | b1 | b0 | | | |
| 0 | 0 | 0 | 0 | S → M | Read slave status | not locked |
| 0 | 0 | 0 | 1 | S → M | Reserved | |
| 0 | 0 | 1 | 0 | S → M | Read slave status | locked |
| 0 | 0 | 1 | 1 | S → M | Read data | locked |
| 0 | 1 | 0 | 0 | S → M | *1 | not locked |
| 0 | 1 | 0 | 1 | S → M | *2 | not locked |
| 0 | 1 | 1 | 0 | S → M | Read slave status | unlocked |
| 0 | 1 | 1 | 1 | S → M | Read data | unlocked |
| 1 | 0 | 0 | 0 | M → S | Write memory address | lock |
| 1 | 0 | 0 | 1 | M → S | Reserved | |
| 1 | 0 | 1 | 0 | M → S | Write command | lock |
| 1 | 0 | 1 | 1 | M → S | Write data | lock |
| 1 | 1 | 0 | 0 | M → S | Reserved | |
| 1 | 1 | 0 | 1 | M → S | Write command | |
| 1 | 1 | 1 | 0 | M → S | Write command | unlock |
| 1 | 1 | 1 | 1 | M → S | Write data | unlock |

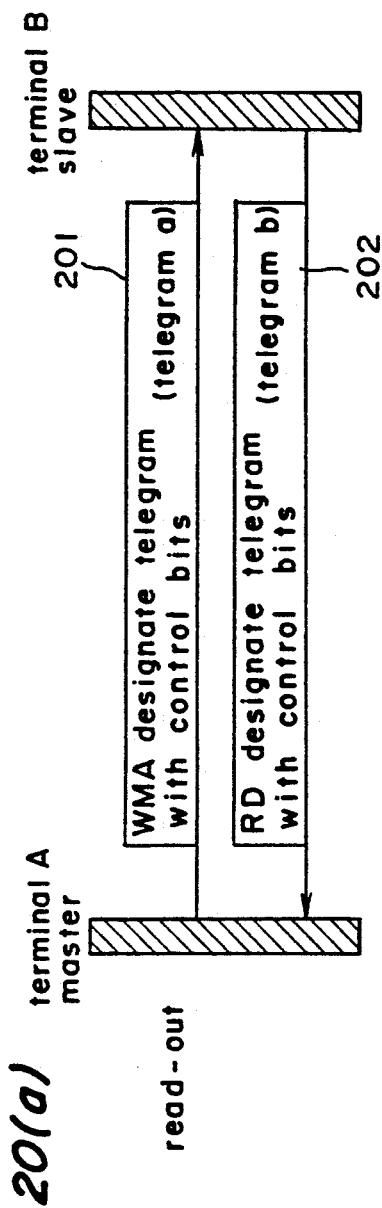
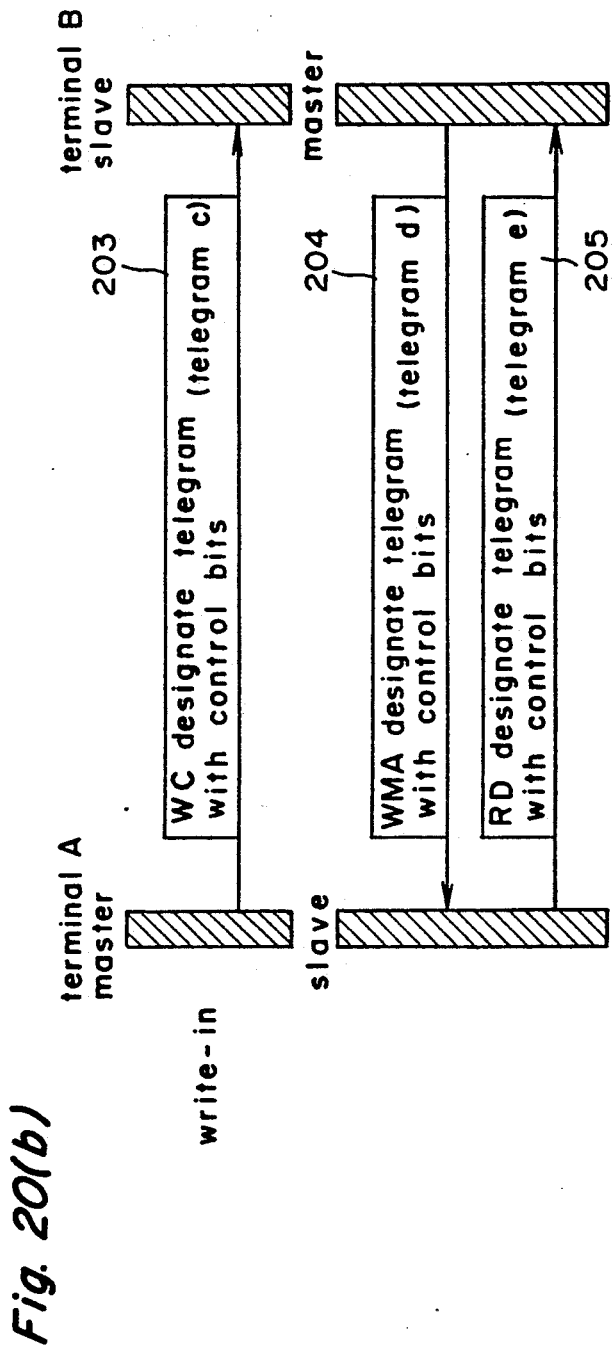
Fig. 20(a)
Fig. 20(b)

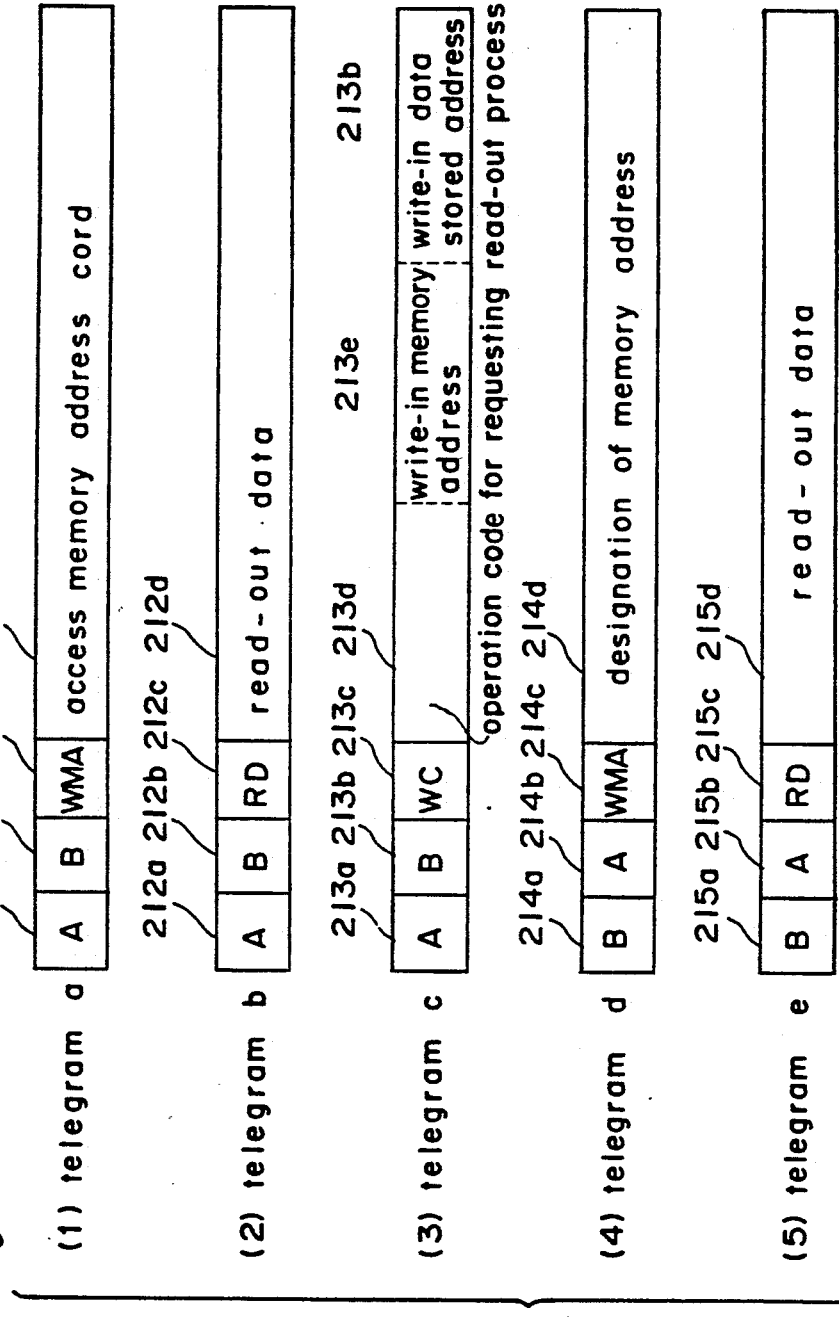

DATA TRANSMISSION CONTROL PROCESSING SYSTEM

BACKGROUND OF THE INVENTION

The present invention generally relates to a communication controlling system for mutually reading and writing the contents of memories by a communication means through control signals.

The prior art will be described with reference to the drawings of FIG. 15 to FIG. 21.

FIG. 15 is a diagram showing an example of a system to which the present invention is applied. FIG. 16 is a diagram showing the telegraphic message configuration of D2B as one example of a communication protocol to which the present invention is applied. FIG. 17 is a diagram showing the instruction contents of the control bits within the telegraphic message shown in FIG. 15. FIG. 18 is a diagram showing the configuration of the write memory address assignment telegraphic message by the conventional D2B. FIG. 19 is a diagram showing the configuration of a command assignment telegraphic message by the conventional D2B. FIGS. 20(a)-20(b) are diagrams showing the sequence in a case where the memory reading control and the writing processing of the other terminal are effected by the conventional D2B. FIGS. 21(1)-21(5) are diagrams showing the telegraphic message configuration example by the use of the sequence shown in FIG. 19.

The exchange of the control signals on a control line 151 in FIG. 15 is subjected to the specification of the D2B. The data region 165 on the telegraphic message on the D2B becomes the content which is chiefly divided into the following three portions by the specification of the control bit 163.

(1) Memory address assignment contents
(2) Control command assignment contents
(3) Optional data The configuration of the data region 165 at the time of the above described "(1) memory address assignment content" becomes an access memory address code 181 as shown in FIG. 18. The configuration of the data region 165 at the time the above described "(2) control command assignment content" has the configuration of an operation code 191 and an operand code 192 as shown in FIG. 19 or the combination of these codes. A case where the terminal A 152 effects the memory control of the terminal B 153 is taken into consideration in such a D2B system. Under the existing circumstances, only the processing of reading the necessary data through the telegraphic message of the write memory address assignment 173 with a control bit 163, and through the read data assignment 172a with a control bit 163 is effected. The terminal A 152 transmits (201) a telegraphic message a with an access memory address code 181 being assigned (211d) to a data region 165 with the master address 161 of the telegraphic message configuration of the D2B shown in FIG. 16 being made a self (terminal A 142) address (211a), the slave address 162 being made the partner (terminal B 143) address (211b), and the control bit 163 being made a write memory address set 193 (211c). Therefore, the terminal A 152 transmits a telegraphic message b with respect to the terminal B 153 with the master address 161 being made a self address (terminal A 152) address (212a), the slave address 162 being made the partner (terminal B 143) address (212b), the control bit 163 being made a read data set 172a/or 172b (212c), the necessary data (212d) from the terminal B153 is read (202) by the synchronous pulse from the terminal B152 to the data region 165 of the above described telegraphic message b by the synchronous pulse from the terminal A 152. Although the write data 175a/or 175b is specified with the control bit 163 as the conventional D2B system is a control type, the concrete directions and so on are not stipulated for, and the data are not easily written with respect to the other terminal.

In order to force the data to be written in the above described system, the data which has a write memory address portion 194 of the partner terminal and a write data store address portion 195 in the operand code portion is required t be read and the demand command 193 must be newly provided. At this time, the terminal A 152 transmits (203) a telegraphic message c with respect to the terminal B 153 with the master address 161 being made a self (terminal A 152) address (212a), the slave address 162 being made a partner (terminal B 143) address (212b), the control bit 163 being made a write command set 174a/or 174b (212c), the operation code (23d) for the above described read processing demand use, the write memory address (213e) and the write data store address (213f) being provided in the data region 165. The terminal B 152 which has received the above described telegraphic message c analyzes the contents of the above described command, sets (214d) in the data region 165 a value of the write data store address 213f within the above described telegraphic message c, transmits to the terminal A 152 (204) a telegraphic message d, with the master address 161 being made a self (terminal B 153) address (214a), the slave address 162 being made the partner (terminal 152) address (214b), the control bit 163 being made the write memory address set 173 (214c), thereafter the terminal B 153 transmits with respect to the terminal A152 a telegraphic message e with the master address 161 being made the self address (terminal B 153) (215a), the slave address 162 being made the partner (terminal A 152) address (215b), the control bit 163 being made the read data set 172a/or 172b (215c) so as to write (205) the data (212d) necessary to the terminal B 153 from the terminal A 152 with the synchronous pulse from the terminal B 153 in the data region 165 of the above described telegraphic message e. But this system has problems in that the sequences become complicated, the management is not easy to effect, because the control system of the reading is used in spite of the writing, the traffic increases by the addition of the number of the telegraphic messages on the transmission passage, and so on.

The control system of the D2B under the existing circumstance has a problem that the writing of the data onto the memory of the other terminal cannot be easily performed with the use of the communication.

SUMMARY OF THE INVENTION

Accordingly, an essential object of the present invention is to provide a data transmission control processing system of easily realizing the reading and writing of the memories of the other terminals coupled with the above described transmission passages in a system where a plurality of terminals provided with a transmitting and receiving control processing portion for transmitting and receiving the control signals are coupled by transmitting passages so as to effect the mutual communication.

Another important object of the present invention is to provide a data transmission control processing system of realizing the writing onto the memories by a system similar to the reading of the memories when the above described system is a system by the D2B.

Still another object of the present invention is to provide a data transmission control processing system which is capable of easily coping with respect to the expansion of the reading.writing control operation of the memories.

A further object of the present invention is to provide a data transmission control processing system of simplifying the realization of the reading and writing control sequence which is adapted to reduce the amount of the telegraphic messages to be exchanged in the reading and writing operation of the memories on the other terminal. In accomplishing these and other objects, the present invention provides a data transmission control processing system which is characterized in that in a communication system where a plurality of terminals provided respectively with a transmitting and receiving control processing portion for transmitting and receiving the control signals are coupled by transmission passages so as to effect mutual communication, a data telegraphic message which configures as a telegraphic message the memory contents of the above described writing or reading to be used when a first terminal writes or reads the memories a second terminal has by the transmission, reception of the above described control signal has a first portion (data identifier) showing a form of the above described data telegraphic message and a writing and reading attribute, and a second portion (data information portion) having the data information of the contents different depending upon the value of the above described first portion. The data information portion has a third portion (access object memory address indication portion) for indicating the address of the memory of the access object for effecting the writing or the reading, and a fourth portion (memory access information portion) showing the specification of the writing or reading onto the above described access object memory and the concrete writing or reading memory contents. The access object memory address indication portion is provided with a fifth portion (memory address type identifier) showing the assignment type of the memory address and a sixth portion (access object memory address information portion) showing the address of the access object memory with a form shown by the above described memory address type identifier. The memory access information portion is provided with a seventh portion (memory access type identifier) showing a form of the memory information to be accessed, an eighth portion (access object memory information portion) showing the size of the memory contents to be accessed and the memory contents to be concretely written on.

The present invention provides a data transmission control control processing system which is characterized in that as an address assignment form of the memory by the telegraphic message, the above described access object memory address information portion is provided with a first address form (direct address assignment form) for specifying a value the same as the value of the memory address and a second assignment form (indirect address assignment form) type) for specifying a conversion rule in which a value converted by such a conversion rule becomes an address value by the above described first form, a memory address operation code for specifying the contents of the conversion processing and a memory address operand code which is an information portion necessary to carry out the above described conversion processing specified are used so as to specify the conversion rule.

Such a configuration as described hereinabove can realize the configuration of the telegraphic message which has the expansion property in the reading and writing control of the memory of the other terminals to be coupled by the transmission passages.

Also, when the present communication system is a system by the D2B, the coexistence with the conventional system may be provided by the use of the telegraphic message configuration by the present invention in the write data for writing use onto the memory of the other terminal. Also, the D2B may be used not only as the control use, but also as the data communication system.

Also, in the data telegraphic message, a portion for setting the address of the memory on the other terminal for the writing operation is provided, so that the realization of the writing control sequence for reduction in the telegraphic message amount which is to be exchanged in the writing of the memory on the other terminal. Thus, the traffic of the transmission passage may be reduced and also, the apparatus control processing may be also reduced.

Also, an access object memory address indication portion is provided in the data telegraphic message. Furthermore, the above described access object memory address indication portion is configured to be provided with a portion (memory address type indication portion) showing the specification type of the memory address and a portion (access object memory address information) showing the address of the access object memory in a form shown by the above described access type indication portion, so that the expansion property is provided in the specification of the access memory. Thus, the access of the memory may be easily effected even between the terminals where the access system of the memory is different, the different is provided in the address of the memory to be specified.

Also, an information portion about the contents of the memory to be accessed is provided in the data telegraphic message, and a portion where the specification of the size of the read or write memory contents is concretely indicated is provided and so that the transmitting, receiving operation of a lot of telegraphic messages which cannot be received and transmitted in one telegraphic message may be also realized easily in the minimum sequence, and the the expansion property and the reduction in the traffic on the transmission passage may be improved.

Also, a direct address assignment form and an indirect address assignment form are provided as an address assignment form of the memory by the telegraphic message. In order to specify a conversion rule, it is configured to be performed by the use of a memory address operation code for specifying the contents of the conversion processing in accordance with the conversion rule and a memory address operand code which is the information portion necessary to carry out the specified conversion processing, so that the accessing may be easily performed by the specification of the indirect address for the memory address assignment of the above described data, and the expansion property may be provided in the system control when the stored memory address of the data to be wanted on the other terminal is not known or even when the memory address to be written is not known.

Also, when the above described communication system is a system by the D2B, the writing and reading of the memory may be effected in a similar system by the use of the telegraphic message configuration of the present invention in the write memory address for the memory address specification use of the other terminal, so that the construction of the apparatus and the system control may be made easier.

BRIEF DESCRIPTION OF THE DRAWINGS

These and other objects and features of the present invention will become apparent from the following description taken in conjunction with the preferred embodiment thereof with reference to the accompanying drawings, in which;

FIG. 8 is a diagram showing a concrete example of the relationship between the memory access type identifier for configuring the memory access information in the WMA telegraphic message and the configuration of the access object memory information portion;

FIGS. 9(a) and 9(b) are diagrams showing a sequence example for writing the data onto the other terminal by the WD assignment telegraphic message of the present invention application in the D2B;

FIGS. 14(a) (1)–14(a) (3) and 14(b) (4)–14(b) (6) are diagrams showing the respective telegraphic message configurations in FIG. 11 and FIG. 12;

FIG. 17 is a diagram showing the indication contents of the control bit within the telegraphic message shown in FIG. 15;

FIGS. 20(a) and 20(b) are diagrams showing the sequence in a case where the memory reading control and writing processing of the other terminal by the conventional D2B is effected; and FIGS. 21(1)–21(5) are diagrams showing the telegraphic message configuration example to be used in the sequence shown in FIG. 19.

DETAILED DESCRIPTION OF THE INVENTION

Figure 1:
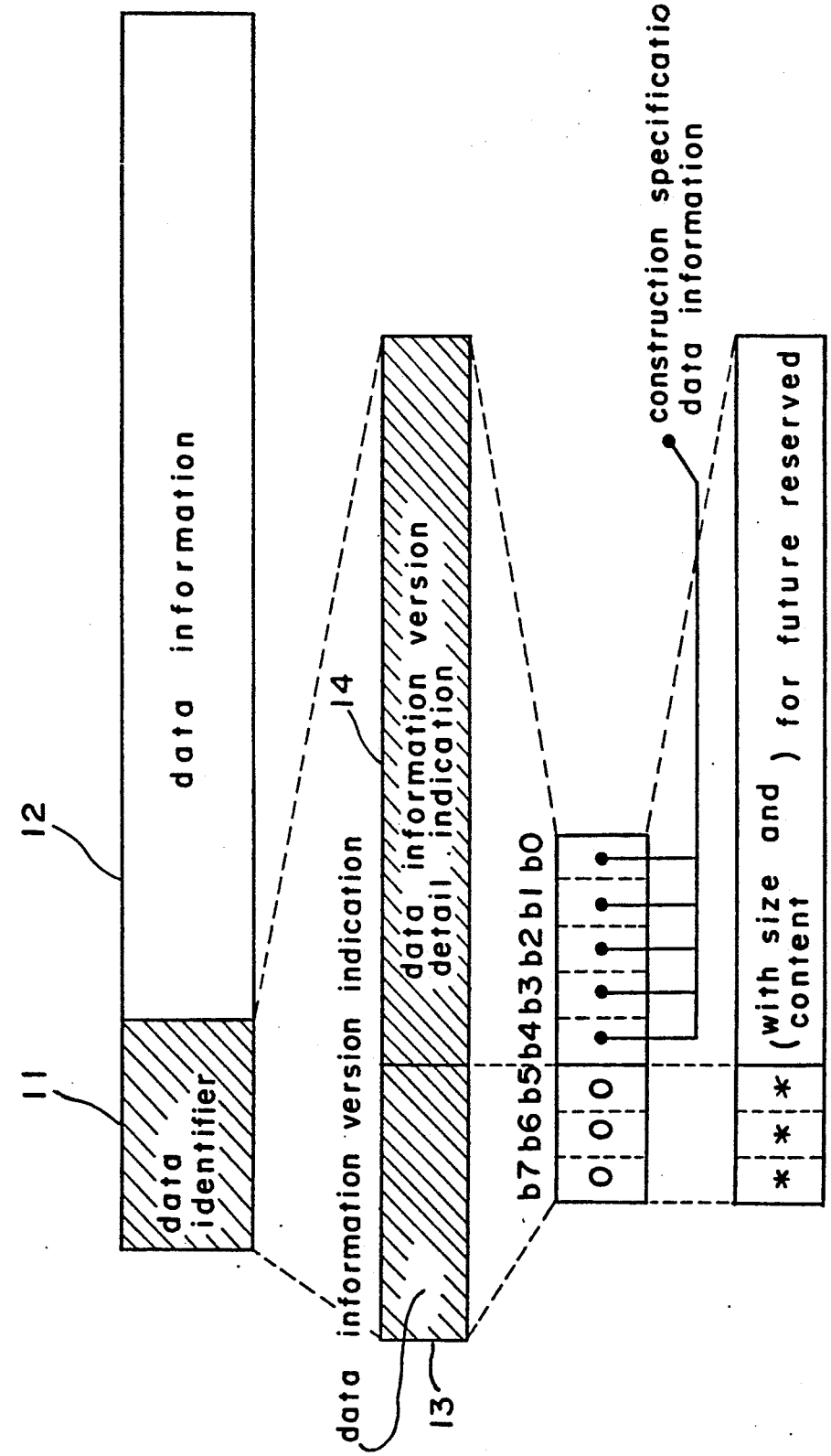
FIG. 1 is a diagram showing one embodiment of the configuration of the data telegraphic message and a data identifier of the present invention.

Before the description of the present invention proceeds, it is to be noted that like parts are designated by like reference numerals throughout the accompanying drawings.

Figure 2:
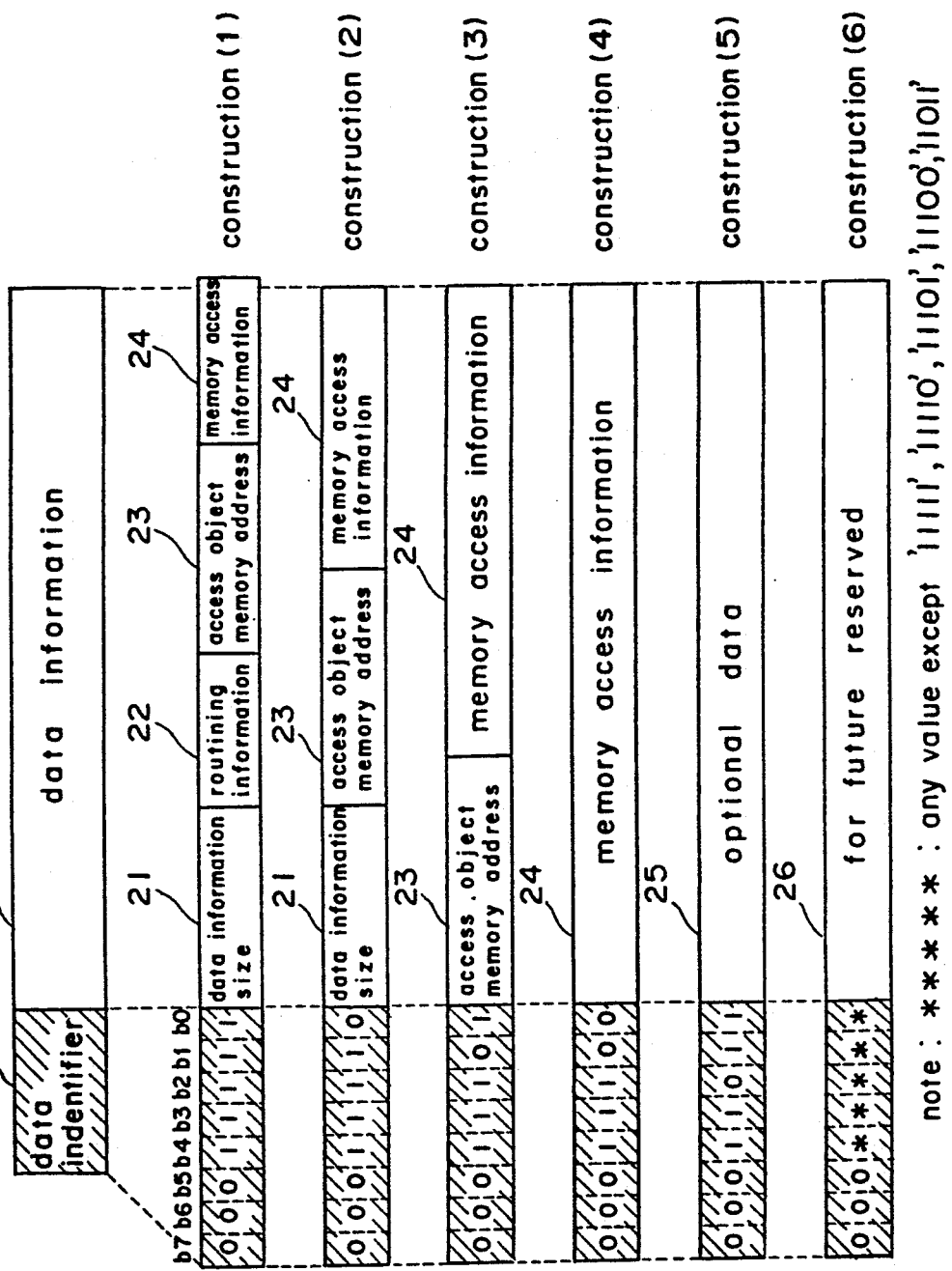
FIG. 2 is a diagram showing a concrete embodiment of the relationship between a data identifier for configuring the data telegraphic message and the configuration of the data information portion.
Figure 3:
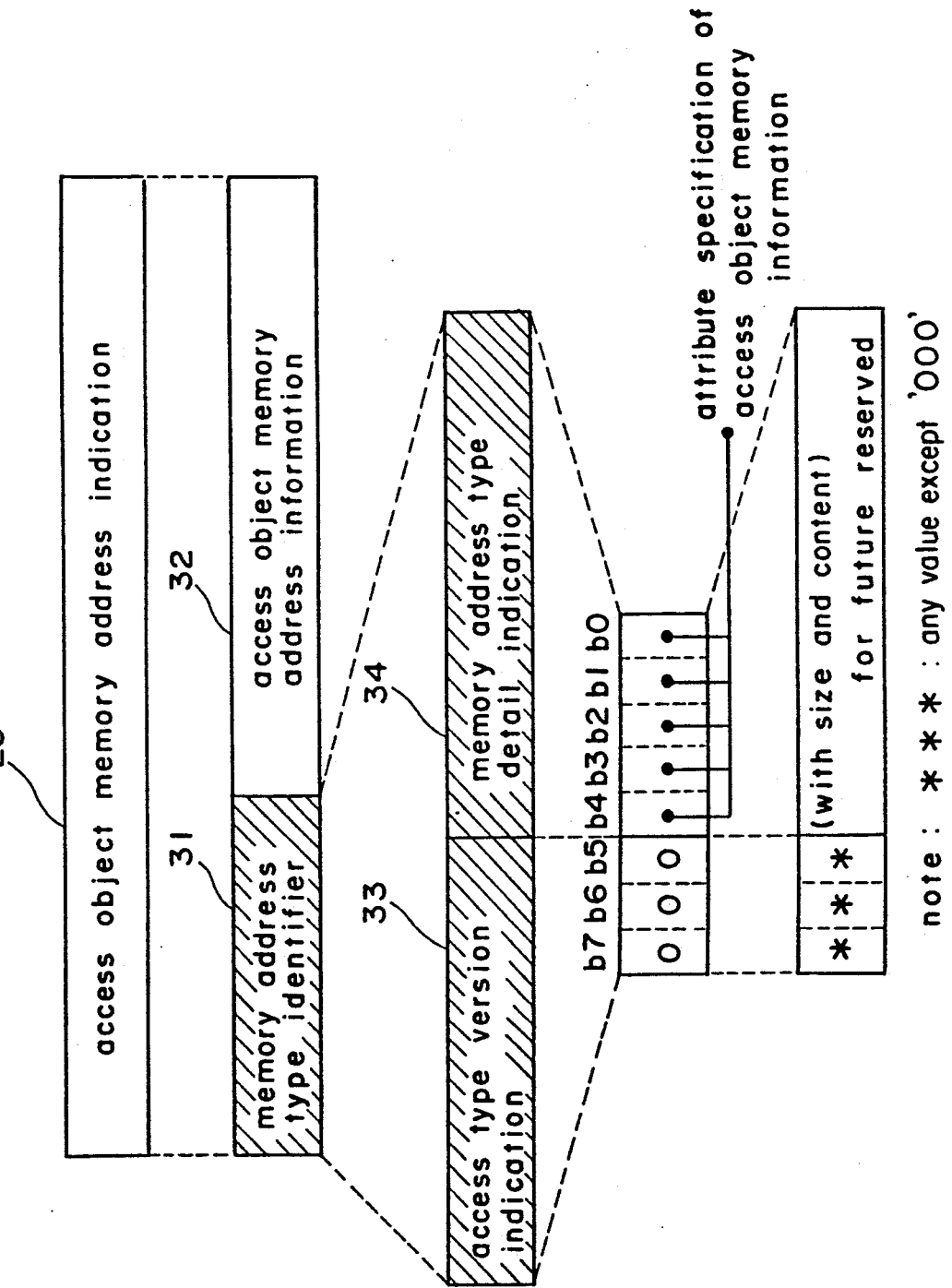
FIG. 3 is a diagram showing one embodiment of the configuration of an access object memory address portion and the memory address type identifier.
Figure 4:
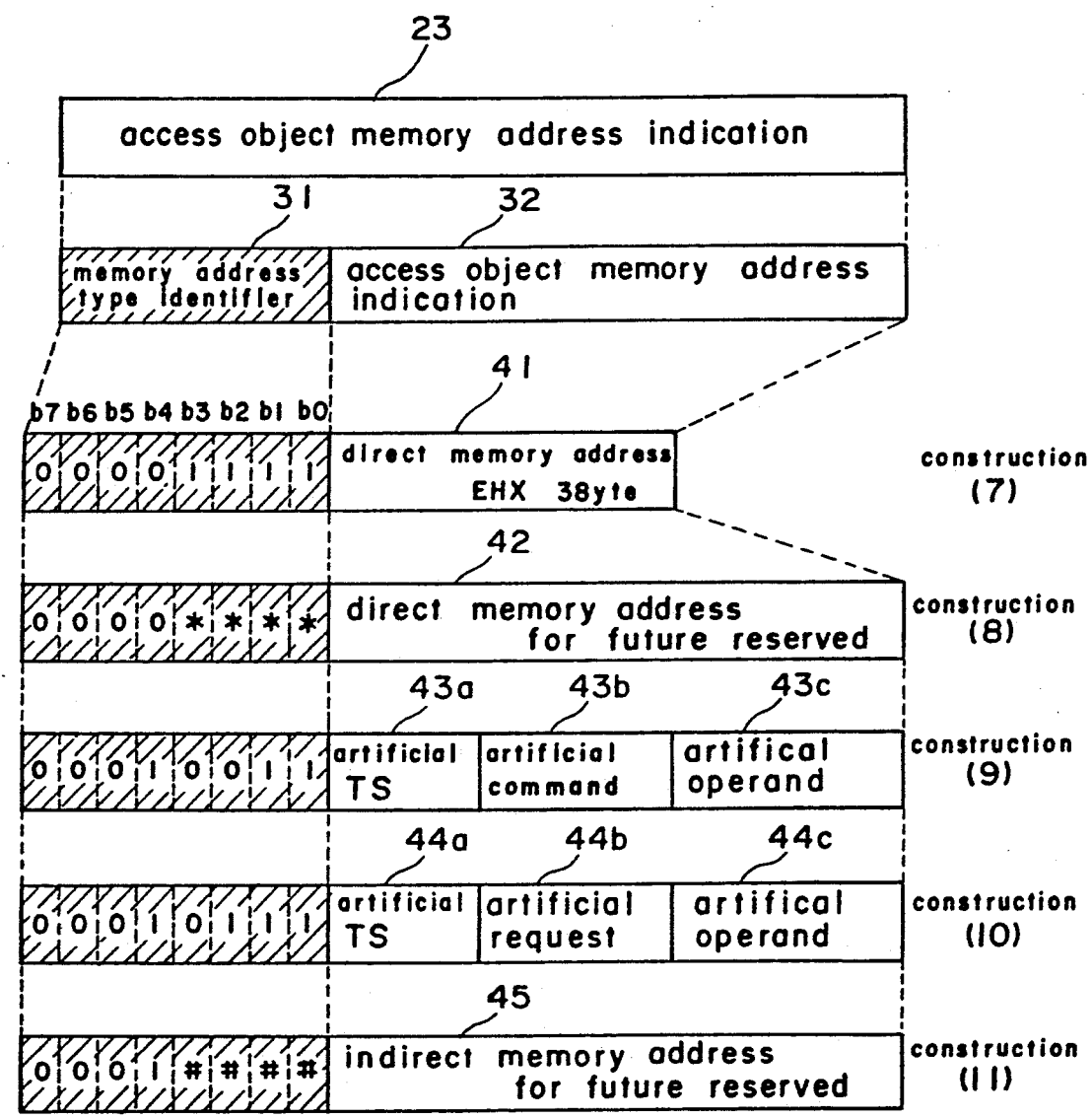
FIG. 4 is a diagram showing a concrete embodiment of the relationship between the memory address type identifier for configuring the access object memory address and the configuration of the access object memory address information portion.
Figure 5:
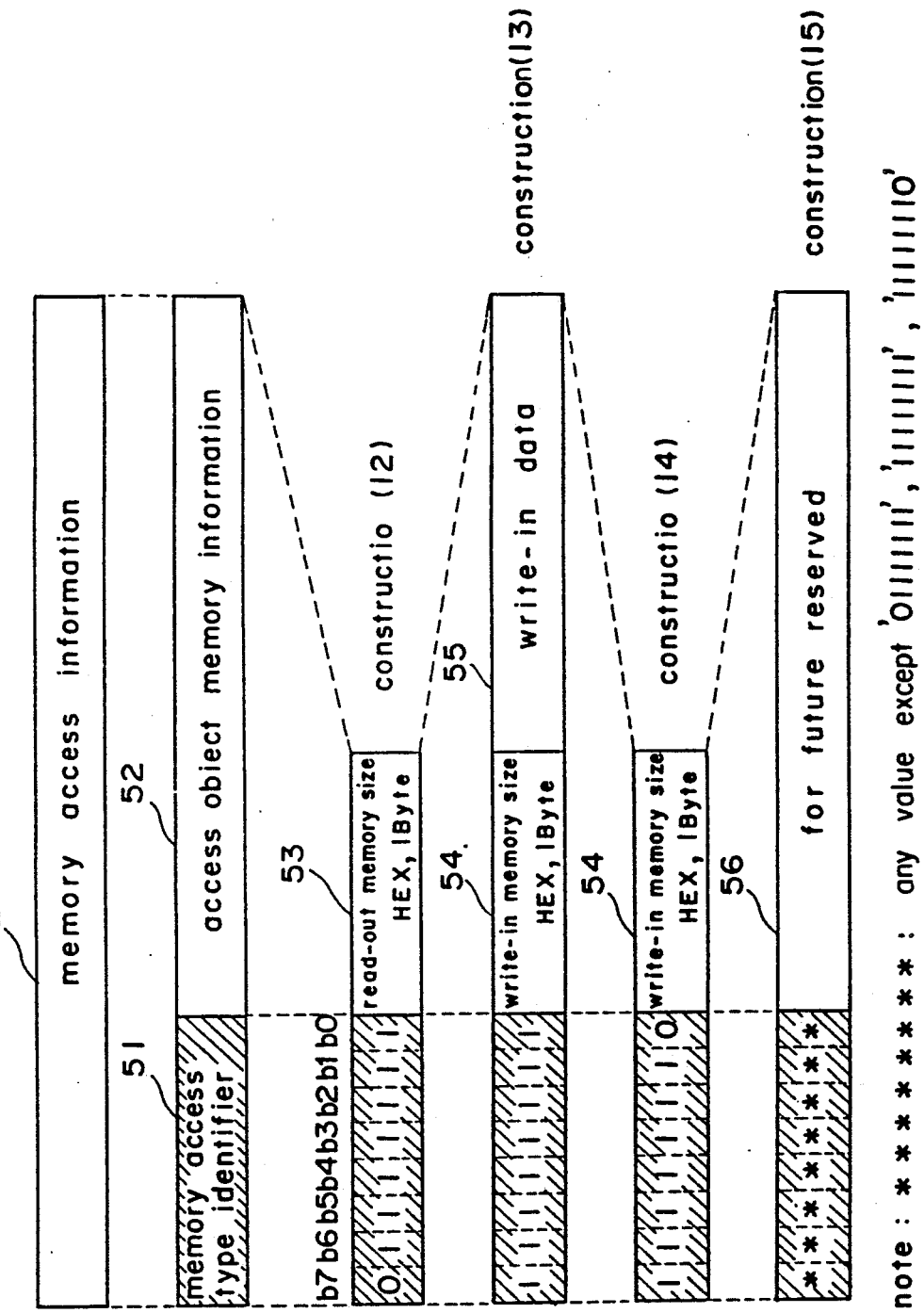
FIG. 5 is a diagram showing one example of the relationship between the memory access type identifier for configuring the memory access information and the configuration of the access object memory information portion.
Figure 6:
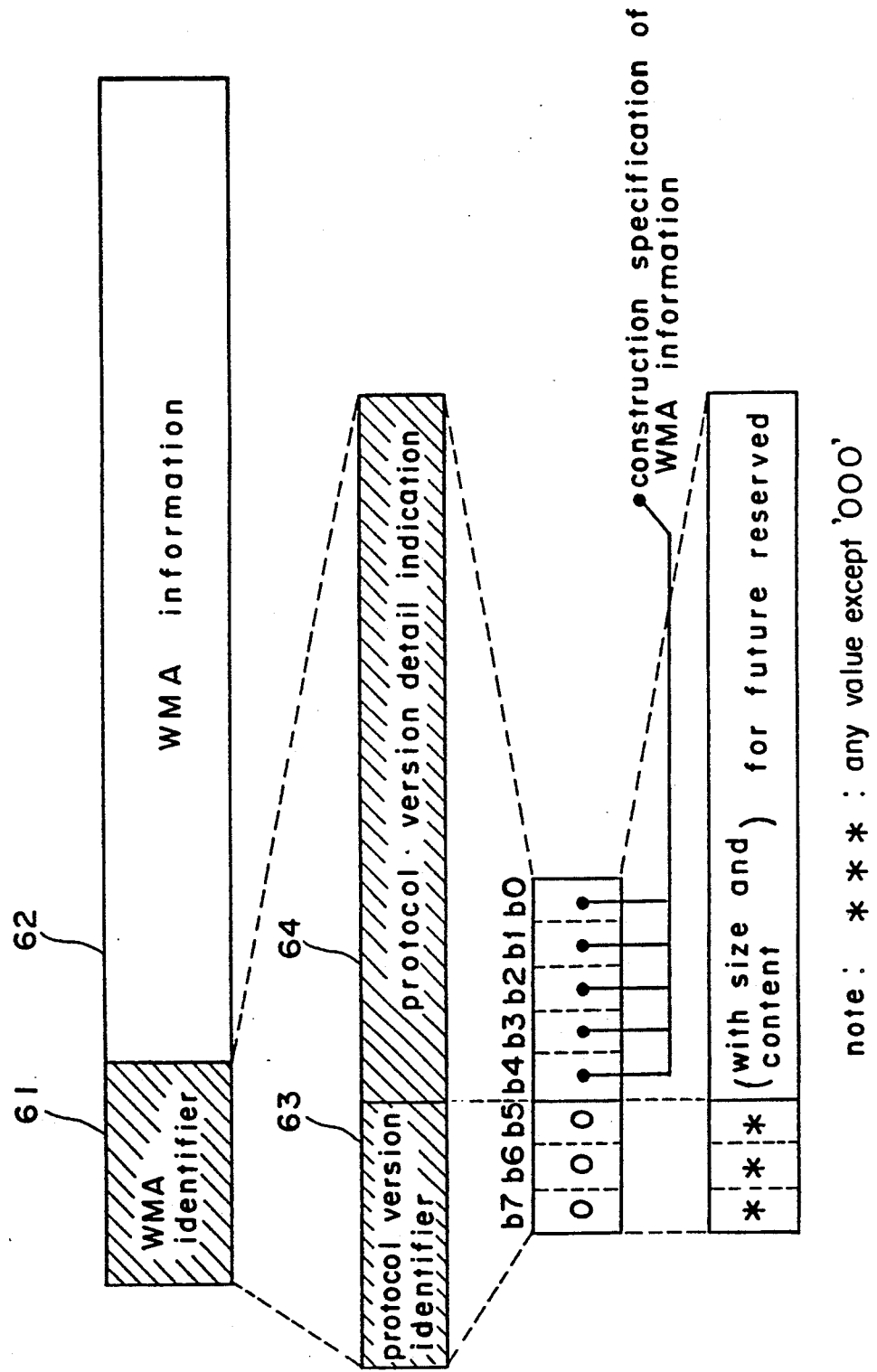
FIG. 6 is a diagram showing one embodiment of the configuration wherein the data telegraphic message configuration shown in FIG. 1 has been applied to the configuration of the WMA (write memory address) assignment telegraphic message by the D2B and the configuration of the WMA indicator.
Figure 7:
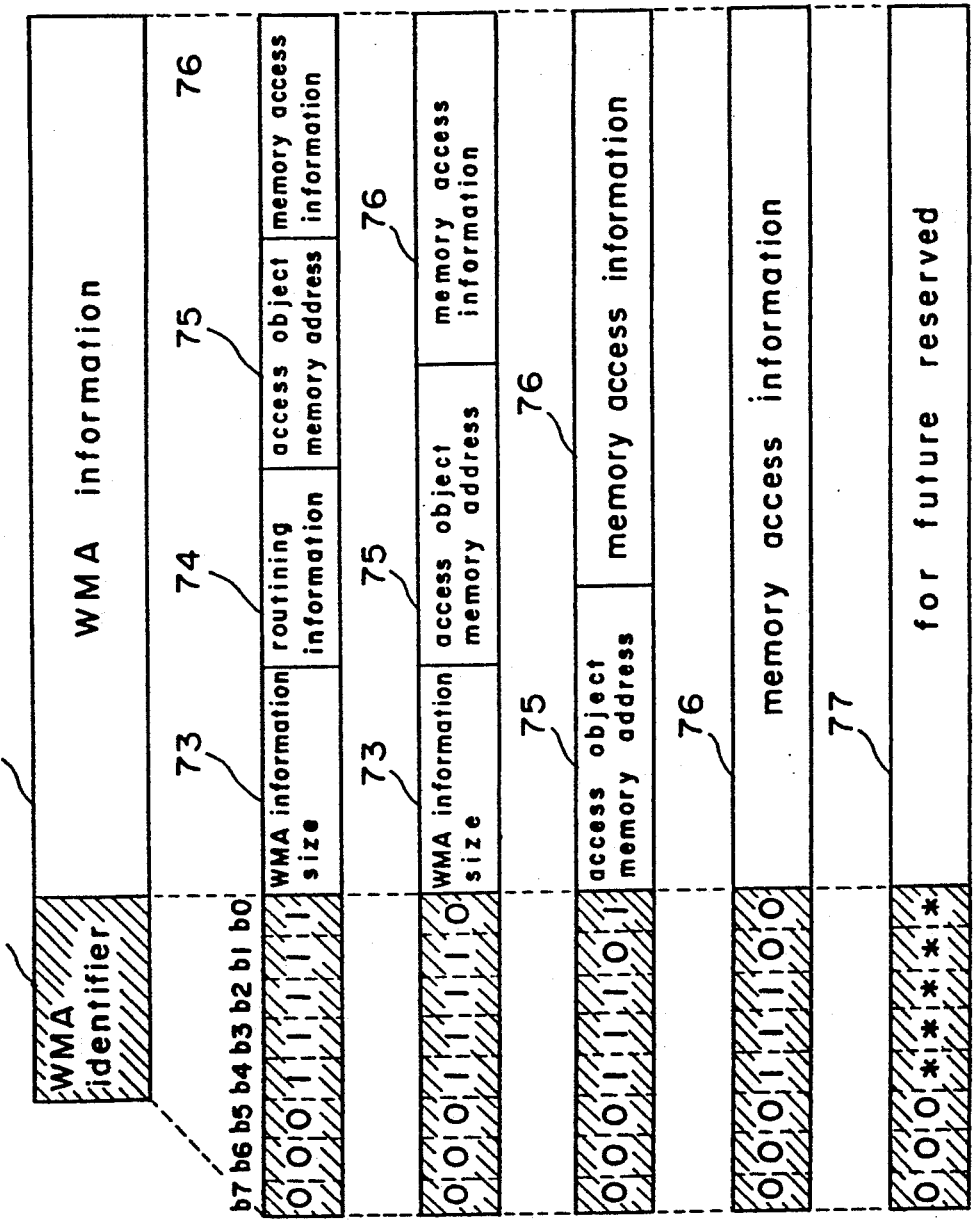
FIG. 7 is a diagram showing a concrete example of the relationship between the WMA identifier for configuring the WMA assignment telegraphic message and the configuration of the WMA information portion.
Figure 10A:
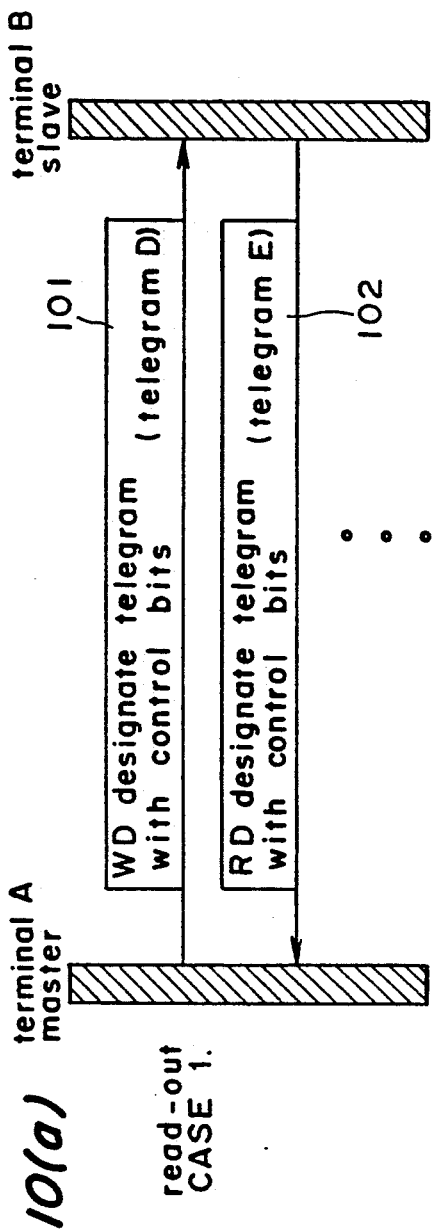
FIGS. 10(a) and 10(b) are diagrams showing the sequence example for reading the data of the other terminal by the WD assignment telegraphic message of the present invention application in the D2B.
Figure 10B:
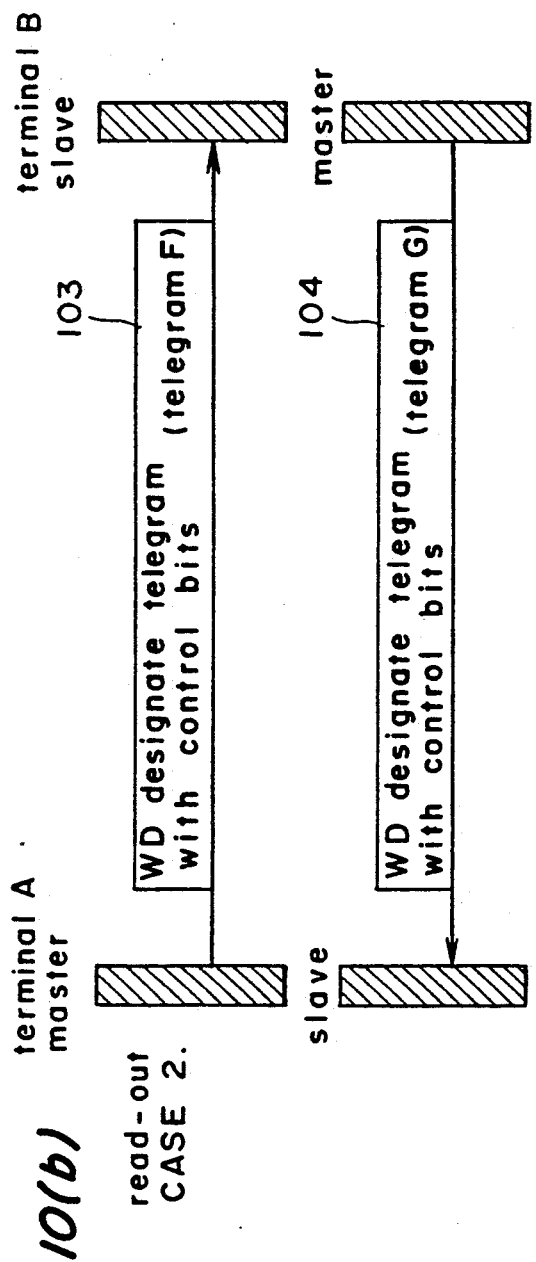
Figure 11:
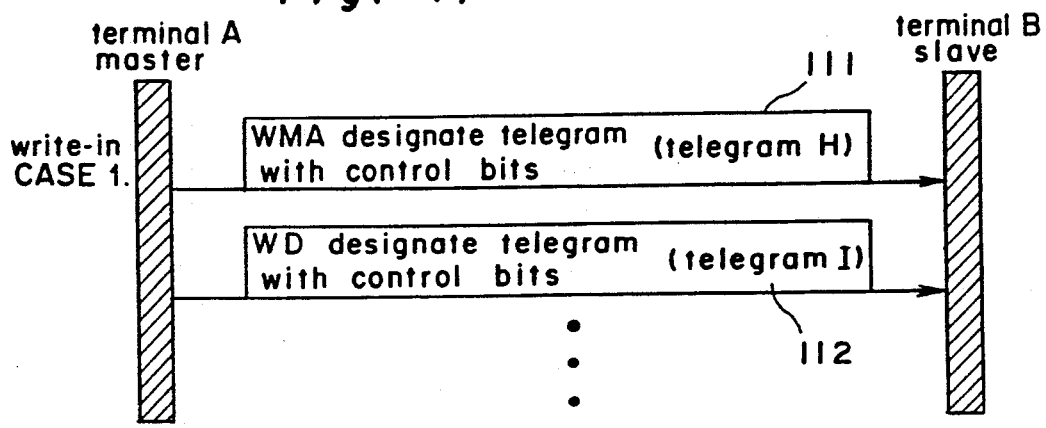
FIG. 11 is a diagram showing the sequence for writing the data onto the other terminal by the WMA assignment telegraphic message of the present invention.
Figure 12A:
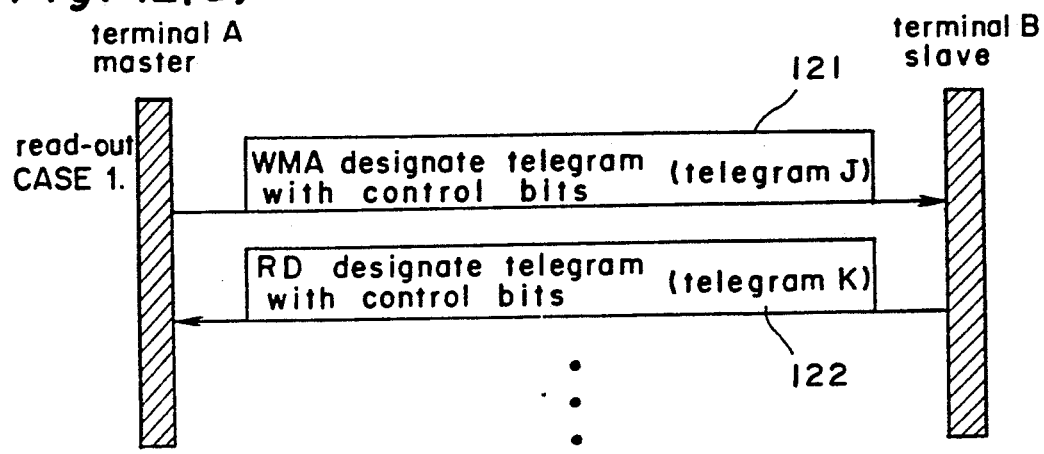
FIGS. 12(a) and 12(b) are diagrams showing a sequence for writing the data of the other terminal by the WMA assignment telegraphic message of the present invention.
Figure 12B:
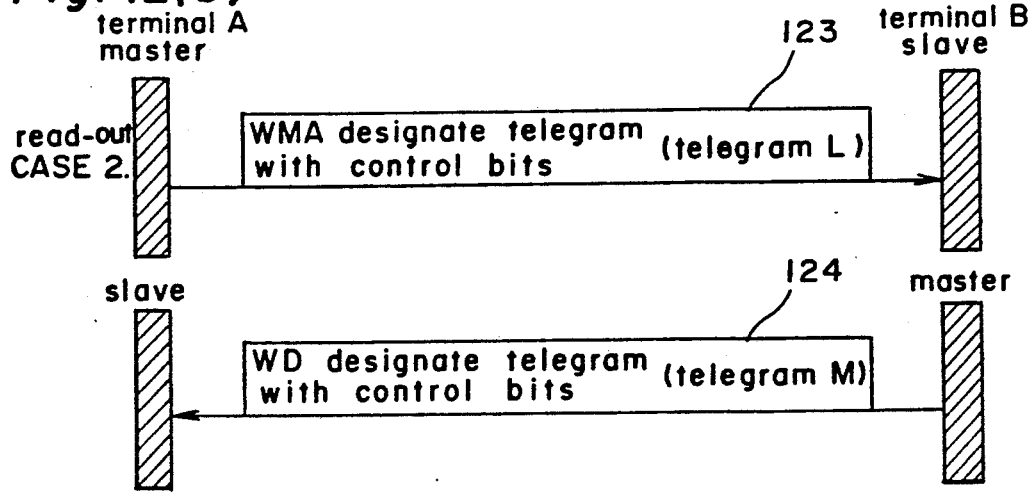
Figure 13A:
FIGS. 13(a) (1)–13(a) (4) and 13(b) (5)–13(b) (7) are diagrams showing the respective telegraphic message configuration in FIG. 9 and FIG. 10.
Figure 15:
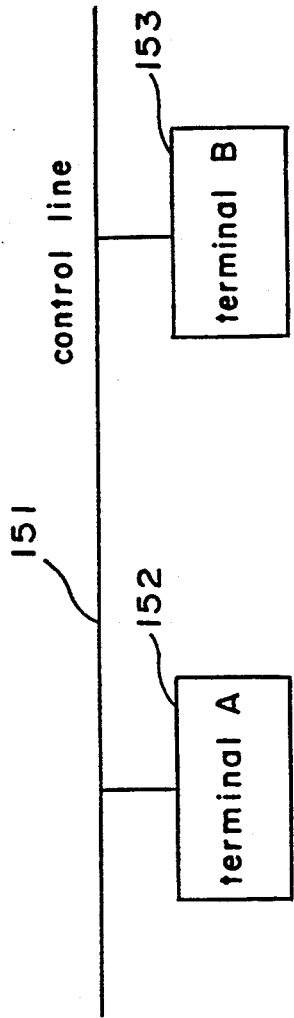
FIG. 15 is a diagram showing the configuration example of a system to which the present invention may be applied.
Figure 16:
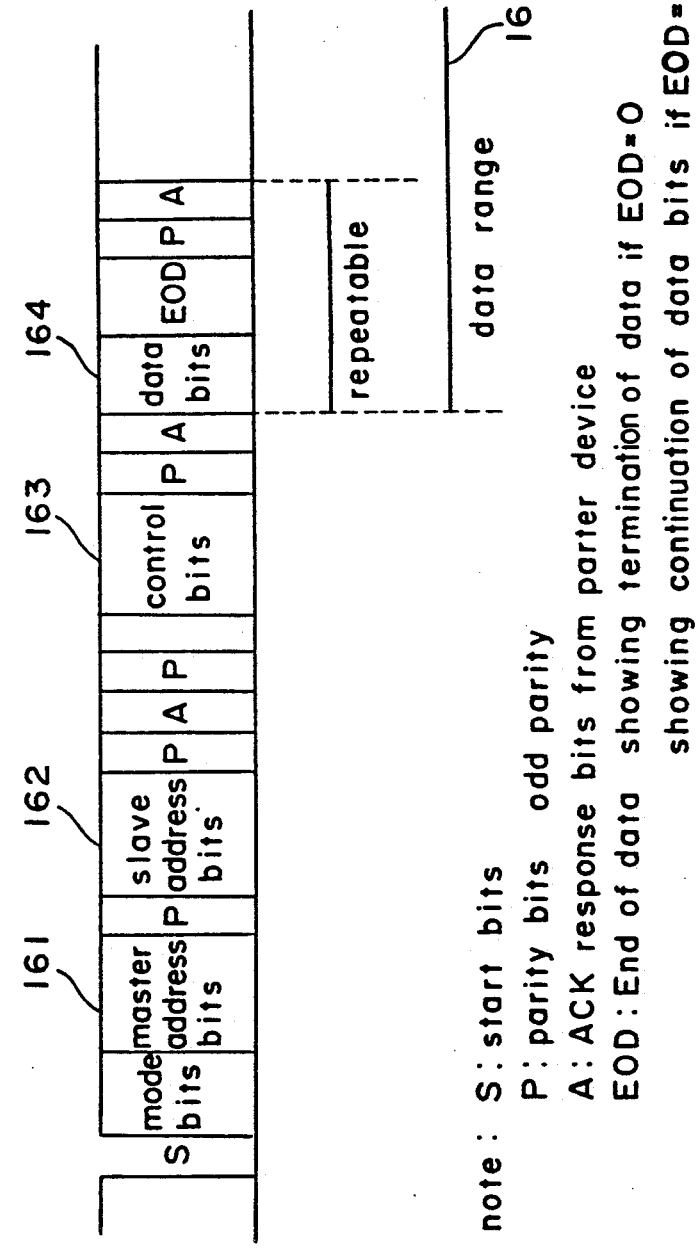
FIG. 16 is a diagram showing the telegraphic message configuration of the D2B as one example of the communication protocol to which the present invention is applied.
Figure 18:
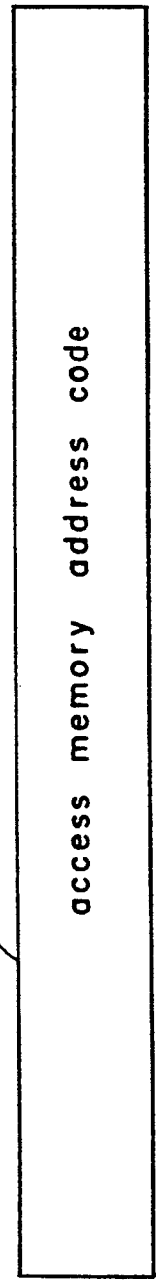
FIG. 18 is a diagram showing the configuration of the write memory address assignment telegraphic message by the conventional D2B.
Figure 19:
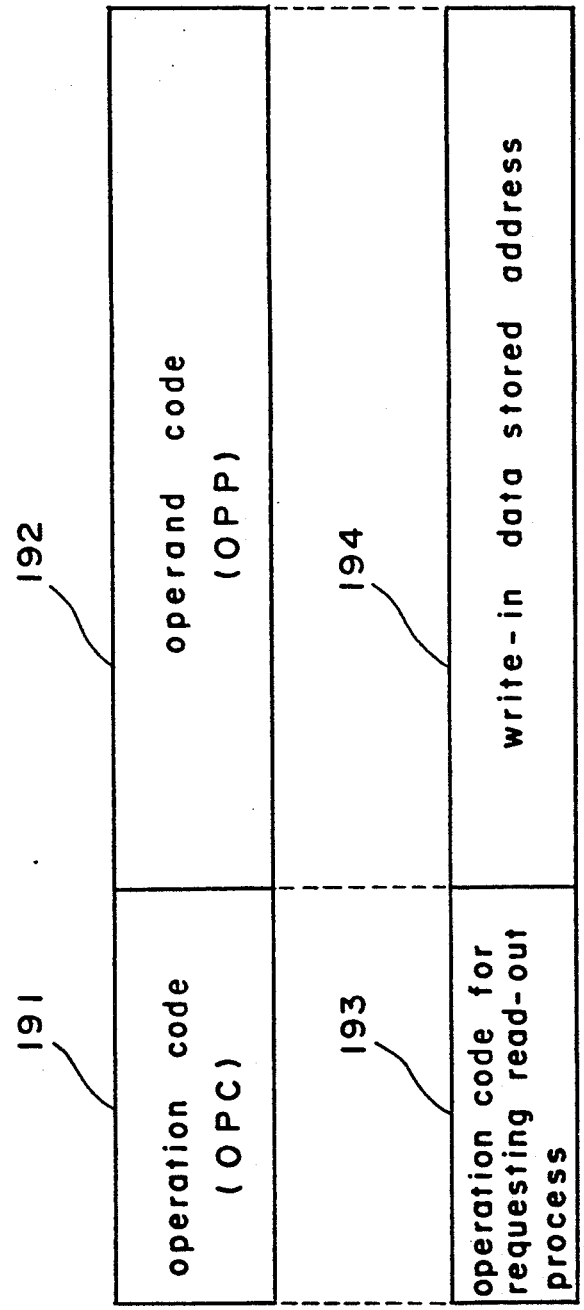
FIG. 19 is a diagram showing the configuration of the command assignment telegraphic message by the conventional D2B.

The embodiment of the present invention will be described hereinafter with reference to FIG. 1 through FIG. 17. FIG. 1 is a diagram showing one embodiment of the configuration of the data telegraphic message and a data identifier of the preset invention. FIG. 2 is a diagram showing a concrete example of the relationship between a data identifier for configuring the data telegraphic message and the configuration of the data information portion. FIG. 3 is a diagram showing one embodiment of the configuration of an access object memory address portion and the memory address type identifier. FIG. 4 is a diagram showing a concrete embodiment of the relationship between the memory address type identifier for configuring the access object memory address and the configuration of the access object memory address information portion. FIG. 5 is a diagram showing one example of the relationship between the memory access type identifier for configuring the memory access information and the configuration of the access object memory information portion. FIG. 6 is a diagram showing one embodiment of the configuration wherein the data telegraphic message configuration shown in FIG. 1 has been applied to the configuration of the WMA (write memory address) assignment telegraphic message by the D2B and the configuration of the WMA indicator. FIG. 7 is a diagram showing a concrete example of the relationship between the WMA identifier for configuring the WMA assignment telegraphic message and the configuration of the WMA information portion. FIG. 8 is a diagram showing a concrete example of the relationship between the memory access type identifier for configuring the memory access information in the WMA telegraphic message and the configuration of the access object memory information portion. FIGS. 9(a) and 9(b) are diagrams showing a sequence example for writing the data onto the other terminal by the WD assignment telegraphic message of the present invention application in the D2B. FIGS. 10(a) and 10(b) are diagrams showing the sequence example for reading the data of the other terminal by the WD assignment telegraphic message of the present invention application in the D2B. FIG. 11 is a diagram showing the sequence for writing the data onto the other terminal by the WMA assignment telegraphic message of the present invention. FIGS. 12(a) and 12(b) are diagrams showing a sequence for reading the data of the other terminal by the WMA assignment telegraphic message of the present invention. FIGS. 13(a) (1)–13(a) (4) and 13(b) (5)–13(b) (7) are diagrams showing the respective telegraphic message configurations in FIG. 9 and FIG. 10. FIGS. 14(a) (1)–14(a) (3) and 14(b) (4)–14(b) (6) are diagrams showing the respective telegraphic message configurations in FIG. 11 and FIG. 12.

According to the present invention, a system wherein a plurality of terminals provided with a transmitting and receiving control processing portion for transmitting and receiving the control signals are coupled by transmission passages so as to effect the mutual communication, the data telegraphic message, with the memory contents for effecting the above described writing or reading to be used when the first terminal writes or reads the memory having a second terminal by the transmission and reception of the above described control signals being configured a the telegraphic message, is provided with a first portion (data identifier) 11 showing the form of the above described data telegraphic message and the writing and reading attributes, and a second portion (data information portion) 12 having the data information of the different contents by the value of the above described first portion. The above described data identifier 11 is considered to be configured to have in addition a data information version indication portion 13 and a data information version detail indication portion 14. When the data identifier 11 is of a one byte configuration, a plurality of variations are considered by the value of the data identifier 11 as the configuration of the data information portion 12. The various configurations may be realized as the configuration of the data information portion 12 such as the configurations (1) through (3) to be provided with the access object memory address portion 23 and the memory access information portion 24 which are the second embodiment of the present invention, a configuration (4) provided with the memory access information portion 24 only, a configuration (5) of the optional data 25 only and so on. Furthermore, according to the third embodiment of the present invention, the above described access object memory address portion 23 is provided with a memory address type identifier 31 and an access object memory address information portion 32. Furthermore, the above described memory address type identifier 31 is considered to be configured to have the access type version indication portion 33 and the memory address type detail indication portion 34. When the access type version indication portion 33 is of a one byte configuration, a plurality of variations are considered by the value of the access type version indication portion 33 as the configuration of the access object memory address information portion 32. When the memory address type identifier 31 is of a one byte configuration, a plurality of variations are considered by the value of the memory address type identifier 31 as the configuration of the access object memory address information portion 32. The various forms as the configuration of the access object memory address information portion such as the configurations (7) and (8) for specifying the direct memory address 41 which is the present fifth embodiment of the present invention, the configurations (9) through (11) for the indirect memory address specification, and so on may be realized. Furthermore, according to the fourth embodiment of the present invention, the above described memory access information portion 24 is provided with the memory access type identifier 51 and the access object memory information portion 52. When the memory access type identifier 51 is of a one byte configuration, a plurality of variations are considered by the value of the memory access type identifier 51 as the configuration of the access object memory information portion 52. The various forms as the access object memory information portion such as the configuration (12) provided with the reading memory size 53 only, the configuration (13) provided with the reading memory size 54 and the writing data 55, the configuration (14) provided with the writing memory size 54 only, and so on.

When the above described first through fifth embodiment of the present invention have been applied to the telegraphic message configuration of the write data specification in the DOMESTIC DIGITAL BUS (IEC TC (84) 86 reference), the writing CASE 1 and writing CASE 2 shown in FIGS. 9(a) and 9(b) may be realized as the data writing control onto many other terminals, and the reading CASE1 and the reading CASE2 shown in FIG. 10 may be realized as the reading control of the data of the other terminal.

Writing CASE 1 by WD

The resent CASE 1 is suitable for the transmission of the data which are not mass. A terminal A152 address is set (131a) in the self address (master address) 161, and a terminal B153 address is set (131b) in the partner address (slave address) 162. Further, the WD specification 175a or 175b is effected (131c) with the control code 163. At this time, the first through fifth embodiments of the present invention are applied to the data region 165 so as to specify (131d) the codes '00011111', '00011110', '00011101' showing the configuration (1), the configuration (2) or the configuration (3) of FIG. 2 with the data identifier 11. At this time, when the transmission of the telegraphic message is completed with the telegraphic message transmission of one time, the memory access information portion 16 having the value ('11111111'b=x' FF) of the memory access type identifier 51 which is set to be provided with the writing data 55 has only to be configured (telegraphic message A) so as to transmit it (91).

Writing CASE 2 by WD

The present case is suitable for the transmission of mass data. The portion where the telegraphic message B to be used in the present case is different from the telegraphic message A is that there is no specification of the writing data 55 in the memory access information portion 24. The memory access information portion 24 having the value ('11111110'b=x' FE) of the memory access type identifier 51 is configured (telegraphic message B) and is transmitted (92). Thereafter, a telegraphic message C for setting with the data identifier 11 that the data information portion 12 is the optional data is transmitted (93). The telegraphic message C may be also transmitted continuously with a plurality of telegraphic messages, depending upon the amount of the writing data.

Reading CASE 1 by WD

The present case shows the expansion property of the present invention. According to the fourth embodiment of the present invention, the WD telegraphic message is not always necessary to retain the writing data portion 55, the specification of the reading memory 53 is effected if the configuration (12) shown in FIG. 5 is used. The telegraphic message D wherein the specification of the above described reading memory size 53 has been effected is transmitted (101). Thereafter, the data of the size specified with the reading memory size 53 is read with RD (102) from the memory region specified on the access object memory address portion 23 of the terminal B153.

Reading CASE 2 by WD

The present invention reads by a pseudo-command specification (telegraphic message 1) or a pseudo-request specification (telegraphic message J) with the access object memory address portion 23, and notifies (103) the terminal B153 of the control for the reading with a telegraphic message F where the indication of the region specification of the memory has been performed, and thereafter, the master and the slave are inverted so as to transmit (104) the telegraphic message.

Although the above description is that the first through fifth inventions have been applied to the data region 165 of the WD with the D2B being an example, the present first through fifth inventions may be applied even to the telegraphic message control of the WMA with some corrections. If the application into the WMA is considered, FIG. 6 which is the same in the configuration as FIG. 1 may be set. The data identifier 11 in a case by the WD is replaced in configuration with the WMA identifier 61, and the data identifier 12 is replaced in configuration with the the WMA information 62. Also, the data information size 21 is changed in identifier into the WMA information size 73. But the contents to be meant are the same. The big difference between the WD and the WMA is that in the WMA, the actual writing data itself is not sent. Therefore, the (Writing CASE1 by WD) is not realized in the WMA. The (Writing CASE1 by WMA) corresponds with respect to the (Writing CASE2 by WD). (Writing CASE1 by WMA)

The present case is suitable for the transmission of the mass data. The telegraphic message H to be used in the present case is similar to the telegraphic message B except that the value of the control bit 163 is the WMA specification 173. Therefore, the telegraphic message I as in the telegraphic message C may be also transmitted continuously by plurality depending upon the amount of the writing data. (111, 112)

Reading CASE 1 by WMA

The present case shows the expansion property of the present invention. According to the fifth embodiment of the present invention, the configuration J by the WMA telegraphic message is set the same as the configuration K by the WD telegraphic message, and the same may be configured in the sequence. (121), 122)

Reading CASE 2 by WMA

The present invention reads, as in the case by the WD telegraphic message, with a pseudo-command specification (telegraphic message L) or a pseudo-request specification (telegraphic message M) with the access object memory address portion 23, and notifies (123) the terminal B153 of the control for the reading with a telegraphic message L where the indication of the region specification of the memory has been performed, and thereafter, the master and the slave are inverted so as to transmit (124) the telegraphic message.

As described hereinabove, according to the present invention, the reading, writing of the memory of the other terminals coupled by the transfer passage may be easily realized, the expansion property may be given to the reading writing control of the memory of the other terminals, the control sequence of the reading.writing for reducing the telegraphic message amount to be exchanged when the reading and writing of the memories on the other terminals may be easily realized, the traffic reduction on the transmission passage is effected, and also, the reduction in the apparatus control processing may be improved and a system superior in the expansion property may be provided.

As is clear from the foregoing description, the present invention has following effects in a system where a plurality of terminals provided with a transmitting, receiving control processing portion for transmitting, receiving the control signals are coupled by the transmission passages so as to effect the mutual communication.

(1) The configuration of the telegraphic message which has the expansion property in the reading and writing control of the memory of the other terminals coupled by the transmission passages may be realized.

(2) When the above described system is a system by the D2B, it may coexist with the conventional system, the D2B may be used not only in the control use, but also even in the communication system by the data.

(3) The writing control sequence of reducing the telegraphic amount to be exchanged when the writing operation of the memory on the other terminal is effected may be easily realized. The traffic reduction on the transmission passage may be effected and also, the reduction in the apparatus control processing may be improved.

(4) Even between the terminals where the access system of the memory is different, with the difference in the address of the memory to be specified as the expansion property is produced in the specification of the access memory, the access of the memory may be easily performed so as to produce the expansion property in the system control.

(5) The transmission, reception of a lot of the telegraphic messages which cannot be transmitted or received in one telegraphic message may be also realized easily in the minimum sequence, the expansion property and the reduction in traffic on the transmission passage may be improved.

(6) When the memory address where the data to be wanted on the other terminal is stored is not known, or even when the memory address to be written is not known, the accessing may be easily effected by the specification of the indirect address for the memory address specification of the above described data so as to produce the expansion property in the system control.

(7) As the writing and reading of the memory may be effected in the similar system in a system by the D2B, the configuration of the apparatus and the system control may be simplified.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. A data transmission control processing system where in a communication system where a plurality of terminals provided respectively with a transmitting, receiving control processing portion for transmitting, receiving control signals are coupled by transmission passages so as to effect the mutual communication, a data telegraphic message which configures as a telegraphic message the memory contents of the above described writing or reading to be used when a first terminal effects the writing or reading of the memories a second terminal has by the transmission and reception of above described control signal is provided with a first portion (data identifier) showing the form of the above described data telegraphic message and the writing, reading attribute, and a second portion (data information portion) having the data information of the contents different depending upon the value of the above described first portion, the data information portion is provided with a third portion (access object memory address indication portion) indicating the address of the memory of the access object for effecting the writing or the reading, and a fourth portion (memory access information portion) showing the specification of the writing or reading onto the above described access object memory and the concrete writing or reading memory contents, the access object memory address indication portion is provided with a fifth portion (memory address type identifier) showing the assignment form of the memory address and a sixth portion (access object memory address information portion) showing the address of the access object memory with a form shown with the above described memory address type identifier, the memory access information portion is provided with a seventh portion (memory access type identifier) showing a form of the memory information to be accessed, an eighth portion (access object memory information portion) showing the size of the memory contents to be accessed and the memory contents to be concretely written with the form shown by the above described memory access type identifier.

2. A data transmission control processing system described in accordance with the claim 1, where as an address specification form of the memory by the telegraphic message, the access object memory address information portion has a first assignment form (direct address assignment form) for specifying a value the same as the value of the memory address, and a second assignment form (indirect access assignment form) for specifying a conversion rule for converting a value into an address value by the first assignment form, a memory address operation code for specifying the contents of the conversion processing in accordance with the conversion rule and a memory address operand code which is an information portion necessary to carry out the conversion processing specified so as to specify the conversion rule.

3. A data transmission control processing system described in accordance with the claim 1, where the memory address type identifier is provided with an address type version indication portion for indicating the version of the address type and a memory address type detail indication portion for fully indicating the type of the memory address.

4. A data transmission control processing system described in accordance with the claim 1, where the data identifier is provided with a data information version indication portion for indicating the version of the data information and a data information version detail indication portion for indicating the detailed configuration of the data information.

* * * * *